Patented Aug. 16, 1932

1,871,791

UNITED STATES PATENT OFFICE

RAYMOND W. HESS, OF BUFFALO, NEW YORK, AND ORIN D. CUNNINGHAM, OF INDIANAPOLIS, INDIANA, ASSIGNORS TO NATIONAL ANILINE & CHEMICAL COMPANY, INC., OF NEW YORK, N. Y., A CORPORATION OF NEW YORK

PROCESS OF MAKING CARBAZOLE INDOPHENOLS

No Drawing.   Application filed October 21, 1926.   Serial No. 143,295.

This invention relates to improvements in the manufacture of indophenols, and more particularly to indophenols produced by the condensation of a para-nitrosophenol with carbazole.

This application is a continuation in part of our application, Ser. No. 546,859, filed March 25, 1922, issued as Patent No. 1,662,062, dated March 13, 1928, and includes subject matter divided out of that application.

Heretofore, the method generally employed for the manufacture of indophenols by the condensation of p-nitrosophenol with carbazole has been to add, with stirring and cooling, either the solid p-nitrosophenol, or a sulfuric acid solution of p-nitrosophenol, to a sulfuric acid solution of carbazole and subsequently pouring the reaction mass onto ice, filtering off the precipitated indophenol and washing it with water until it shows a neutral reaction.

The present invention is based upon the discovery that indophenols manufactured by the condensation of carbazole and p-nitrosophenol in the presence of a suitable condensing agent, such as sulfuric acid, are produced with superior yields of a purer indophenol and with less by-product provided the conditions of the condensation are such that, for each mol of carbazole present in the condensing medium there is always at the same time present more than one mol of nitrosophenol. That is, during the condensation of carbazole and nitrosophenol to produce indophenol there should be present throughout the reaction an excess of nitrosophenol over and above that necessary to just combine or condense with the carbazole since we have found that carbazole reacts with indophenol to produce by-products and that p-nitrosophenol does not.

We have also discovered that the strength of the sulfuric acid employed, and the temperature at which the condensation of the p-nitrosophenol with the carbazole is carried out, are each of importance in securing the production of an indophenol of superior quality and in improved yields. We have found that the lower the temperature at which the condensation can be and is carried out the higher the yield and the better the quality of product. Markedly improved yields and quality of product can be obtained by carrying out the condensation at a temperature not higher than about +5° C. and preferably not above about 0° C., and still more preferably not above about −5° C., and may advantageously be carried out down to a temperature as low as −30° C., or lower.

We have also found that improved results are obtained by the use of sulfuric acid of such strength that at the completion of the condensation the strength of the spent acid will be about 93 to 94 per cent. An acid of this strength has the lowest viscosity and the lowest freezing point of sulfuric acids which lie between 85 and 100 percent strength. The initial use of a sulfuric acid which in or during the condensation gives a spent acid of about 93 to 94 percent permits carrying out the process at low temperatures down to a point approximately that of the freezing point of the initial acid or of the spent acid formed therefrom. 85 percent sulfuric acid freezes at approximately +5° C. and 100 percent acid at about +10° C., while 93 to 94 percent sulfuric acid freezes at about −30° to −37° C. Although a sulfuric acid which gives a weaker or stronger spent acid than indicated can be used in the condensation, the use of such an acid makes it necessary because of its higher freezing point to carry out the condensation at higher temperatures than otherwise, and the disadvantages which result therefrom depend upon the amount of variation of the final strength of the spent acid from about 93 to 94 percent. A sulfuric acid having an initial strength of about 93.5 to 96 percent can be advantageously used and the total amount of acid employed is preferably such that a spent acid of about 93 to 94 percent strength is present at the completion of the condensation. An acid of this strength permits the reaction mixture to be vigorously and thoroughly agitated and also permits carrying the reaction out to completion at a temperature from +5° C. to −30° C., or lower. When acids having an initial strength of about 95 to 96 percent are employed, the amount taken need be only about 5 to 6 times the weight of carbazole employed in the condensation. This amount of acid is considerably less than that employed in heretofore proposed processes for effecting this condensation, and in consequence has economic advantages.

For best results, therefore, we make use of sulfuric acid of the strength and at the temperatures indicated together with the use of such an amount of nitrosophenol that there will always be an excess of it present throughout the reaction.

We have further discovered that pouring the reaction mass into dilute caustic alkali solution containing ice so as to maintain a temperature around 0° C. during the precipitation of the indophenol produces more uniform results with reference to yields and quality of product than does the usual manner of precipitating the indophenol by pouring the reaction mass onto ice.

According to the present invention, we add a sulfuric acid solution of carbazole to a sulfuric acid solution of p-nitrosophenol or a homologue or derivative thereof, or we add dry carbazole to a sulfuric acid solution of p-nitrosophenol or a homologue or derivative thereof, or we add an intimate mixture of carbazole and excess of p-nitrosophenol or a homologue or a derivative thereof to sulfuric acid; and in each case we always have present in the condensing medium an excess of p-nitrosophenol (or a homologue or derivative thereof) both during and at the completion of the combination, and the reaction is preferably carried out at a temperature not higher than about +5° C., or better, not higher than about 0° C., or still better, not above about −5° C. But the condensation may be carried out at any desired temperature between about +5° C. and a temperature just above the freezing point of the acid or the acid solution.

The invention will be further illustrated by the following specific examples, but it will be understood that the invention is not limited thereto. The parts are by weight.

Example 1.—130 parts of p-nitrosophenol are dissolved in 3000 parts of sulfuric acid of 94 percent strength, which are well stirred and well cooled by external means. To this solution, whilst stirring and cooling well, there is added in small portions at a time 167 parts of dry, pulverized carbazole, at such a rate that the temperature of the solution does not exceed about +5° C., preferably maintaining the temperatures between −0° C. and −30° C., care being taken to avoid local overheating. The reaction is complete within a relatively short time, and when complete the reaction mixture is poured cautiously into a well stirred solution composed of about 2400 parts of caustic soda, 20,000 parts of water, and sufficient ice to maintain the temperature during neutralization at approximately 0° C. Sufficient caustic soda should be used so that the solution is slightly alkaline after all the acid is neutralized. The precipitated indophenol is filtered off at once and washed with water until free from alkali and sulfates. It may be dried at about 60° C.

Example 2.—130 parts of p-nitrosophenol are dissolved in 500 parts of well stirred and well cooled sulfuric acid of 95 percent strength, and into this solution, whilst stirring and cooling well the same, there is introduced a well cooled solution of 167 parts of carbazole dissolved in 500 parts of 95 percent sulfuric acid, the mixed solution being maintained at a temperature not to exceed −5° C., preferably between −5° C. and −15° C. during the condensation. The reaction is almost instantaneous and is complete within a relatively short time, and when completed the indophenol is precipitated and isolated in any suitable manner or in a manner similar to that described in Example 1. It will be noted that the total amount of sulfuric acid employed is about six times the weight of carbazole present. 96 percent sulfonic acid may be used in place of 95 percent, in which case a total amount of 800 parts, or about 5 times the weight of carbazole, may be used.

Example 3.—An intimate mixture of 167 parts of pulverized carbazole and 135 parts of pulverized p-nitrosophenol is added to 2000 parts of well cooled and well stirred sulfuric acid of 94.5 percent strength at such a rate that the temperature does not exceed −5° C. When the condensation is complete, the indophenol is precipitated and isolated in a manner similar to that described in Example 1.

Example 4.—130 parts of p-nitrosophenol are dissolved in 1500 parts of sulfuric acid of 94 percent strength, it being well stirred and well cooled to about −30° C. to −35° C. Into this solution, while agitating and cooling well, there is introduced a well cooled solution of 167 parts carbazole dissolved in 1500 parts sulfuric acid of 94 percent strength at such a rate that the temperature of the mixture does not exceed about −30° C. throughout the condensation. When the condensation is complete, the indophenol is precipitated and isolated as described in any of the examples given above.

A large excess of p-nitrosophenol, even to the extent of 50 percent or more, has no harmful effect, while an excess of carbazole is very detrimental. The amount of sulfuric acid may vary but the amount should be at least sufficient to yield a solution or suspension capable of being vigorously and efficiently stirred in order to avoid local overheating.

It will thus be seen that the present invention effects the condensation of carbazole with nitrosophenol in the presence of a condensing agent such as sulfuric acid at low temperatures and in such a manner that at all times during the condensation an excess of nitrosophenol is present whereby side reactions which produce by-products, particularly by-products arising from the interaction of carbazole and indophenol, are eliminated or minimized.

The invention is applicable to the manufacture of indophenols produced by the condensation of carbazole with p-nitrosophenol or homologues or derivatives thereof in the presence of sulfuric acid.

In the claims, it will be understood that the term "para-nitrosophenol compound" denotes and includes p-nitrosophenol, its homologues and derivatives, and the term "low temperature" is used to cover the range of temperature from about +5° C. to about −30° C.

We claim:

1. In the manufacture of an indophenolic compound by condensing carbazole with a para-nitrosophenol compound in the presence of sulfuric acid, the improvement which comprises maintaining throughout the condensation an excess of the para-nitrosophenol compound.

2. In the manufacture of an indophenolic compound by condensing carbazole with a para-nitrosophenol compound, the improvement which comprises introducing a sulfuric acid solution of carbazole into a sulfuric acid solution of a para-nitrosophenol compound, and throughout the condensation maintaining a temperature below +5° C. and an excess of the para-nitrosophenol compound.

3. In the manufacture of an indophenol by condensing carbazole with para-nitrosophenol in the presence of sulfuric acid, the improvement which comprises maintaining an excess of para-nitrosophenol throughout the condensation.

4. In the manufacture of an indophenol by condensing carbazole with para-nitrosophenol, the improvement which comprises introducing a sulfuric acid solution of carbazole into a sulfuric acid solution of para-nitrosophenol, and throughout the condensation maintaining a temperature below +5° C. and an excess of para-nitrosophenol.

5. In the manufacture of a condensation product by condensing carbazole with a para-nitrosophenol compound, the process which comprises bringing one molecular proportion of carbazole into contact with more than one molecular proportion of the para-nitrosophenol compound in the presence of sulfuric acid at a temperature maintained below about +5° C., and at the completion of the condensation, pouring the reaction mass into a dilute solution of caustic soda maintained at a temperature not above about 0° C.

6. In the manufacture of a condensation product by condensing carbazole with para-nitrosophenol, the process which comprises bringing one molecular proportion of carbazole into contact with more than one molecular proportion of para-nitrosophenol in the presence of sulfuric acid at a temperature maintained below about +5° C. and pouring the reaction mass into a dilute solution of caustic soda maintained at a temperature of about 0° C.

7. In the manufacture of an indophenolic compound, the process which comprises condensing carbazole with a para-nitrosophenol compound in the presence of sulfuric acid at a temperature not above about 0° C., the amount and strength of sulfuric acid being such that at the completion of the condensation its strength is approximately 93 to 94 per cent, maintaining in the reaction mixture throughout the condensation an excess of the para-nitrosophenol compound, subsequently precipitating the indophenol compound by the addition of the reaction mixture to an excess of an aqueous solution of caustic alkali maintained at a temperature of about 0° C., and recovering the precipitate.

8. In the manufacture of an indophenolic compound, the process which comprises condensing carbazole with para-nitrosophenol in the presence of sulfuric acid maintained at a temperature of about +5° C. to −30° C., the amount and strength of sulfuric acid being such that at the completion of the condensation its strength is approximately 93 to 94 percent, maintaining in the reaction mixture throughout the condensation an excess of para-nitrosophenol, subsequently precipitating the indophenol compound by the addition of the reaction mixture to an excess of an aqueous solution of caustic soda maintained at a temperature of about 0° C., and recovering the precipitate.

9. In the production of an indophenolic compound by the condensation of carbazole with a para-nitrosophenol compound in the presence of sulfuric acid, the improvement which comprises carrying out the reaction at a temperature maintained between about +5° C. and −30° C., and having present at all times during the condensation more than one molecular proportion of the para-nitrosophenol compound for each molecular proportion of carbazole present.

10. In the production of an indophenolic compound by the condensation of carbazole with para-nitrosophenol in the presence of sulfuric acid, the improvement which comprises having present at all times during the condensatiton more than one molecular proportion of para-nitrosophenol for each molecular proportion of carbazole present.

11. In the production of an indophenolic compound by the condensation of carbazole with a para-nitrosophenol compound in the presence of sulfuric acid, the improvement which comprises carrying out the condensation to completion at a temperature not above about 0° C.

12. In the production of an indophenolic compound by the condensation of carbazole with para-nitrosophenol in the presence of sulfuric acid, the improvement which comprises carrying out the condensation at a temperature not above about 0° C.

13. In the production of an indophenolic compound by the condensation of carbazole with a para-nitrosophenol compound, the improvement which comprises carrying out the condensation in the presence of sulfuric acid of such an amount and strength that at the completion of the condensation the strength of the acid is approximately 93 to 94 percent.

14. In the production of an indophenolic compound by the condensation of carbazole with para-nitrosophenol, the improvement which comprises carrying out the condensation in the presence of sulfuric acid of such strength and amount that at the completion of the condensation the strength of the acid is approximately 93 to 94 percent.

15. In the production of an indophenolic compound by condensing carbazole with a para-nitrosophenol compound in the presence of sulfuric acid and subsequently isolating the indophenolic compound, a process which comprises adding the reaction mixture at the completion of the condensation to a sufficient amount of caustic alkali in solution to neutralize the sulfuric acid and to precipitate the indophenolic compound.

16. In the production of an indophenolic compound by condensing carbazole with para-nitrosophenol in the presence of sulfuric and subsequently isolating the indophenolic compound, a process which comprises adding the reaction mixture at the completion of the condensation to a sufficient amount of caustic soda in solution to neutralize the sulfuric acid and to precipitate the indophenolic compound.

17. The manufacture of condensation products of carbazole and p-nitroso-substituted phenols by bringing carbazole and a p-nitroso-substituted phenol together in presence of a condensing agent at a temperature not exceeding about −5°C. and maintaining the reaction-mixture throughout the condensation at a temperature below 0°C.

18. The manufacture of condensation products of carbazole and p-nitroso-substituted phenols by bringing carbazole and a p-nitroso-substituted phenol together in presence of sulfuric acid at a temperature not exceeding about −5° C. and maintaining the reaction-mixture throughout the condensation at a temperature below 0°C.

19. The manufacture of condensation products of carbazole and p-nitroso-substituted phenols by bringing carbazole and a p-nitroso-substituted phenol together in presence of a condensing agent at a temperature not exceeding about −5°C. and maintaining the reaction-mixture throughout the condensation at substantially the same temperature at which the reacting-substances are initially brought into contact.

20. The manufacture of condensation products of carbazole and p-nitroso-substituted phenols by bringing carbazole and a p-nitroso-substituted phenol together in presence of sulfuric acid at a temperature not exceeding about −5°C. and maintaining the reaction-mixture throughout the condensation at substantially the same temperature at which the reacting substances are initially brought together.

21. The manufacture of condensation products of carbazole and p-nitroso-substituted phenols by bringing together carbazole and a p-nitroso-substituted phenol in presence of sulfuric acid at a temperature not exceeding about −5° C., maintaining the reaction-mixture throughout the condensation at a temperature below 0° C., and precipitating the condensation product by addition of the reaction-mixture to dilute aqueous alkali in excess.

22. The manufacture of a condensation product of carbazole and a p-nitrosophenol by bringing carbazole and p-nitrosophenol together in presence of sulfuric acid at a temperature not exceeding about −5° C. and maintaining the reaction-mixture throughout the condensation at a temperature below 0° C.

23. In the manufacture of a condensation product by condensing carbazole with p-nitrosophenol, the process which comprises bringing carbazole and p-nitrosophenol together in presence of substantially 93.5 to 96 per-cent sulfuric acid at a temperature not exceeding about −5° C. and maintaining the reaction-mixture throughout the condensation at a temperature below 0° C.

24. The manufacture of a condensation product of carbazole and p-nitrosophenol by bringing carbazole and p-nitrosophenol together in presence of sulfuric acid at a temperature not exceeding about −5° C. and maintaining the reaction-mixture throughout the condensation at substantially the same temperature at which the reacting substances are initially brought into contact.

25. In the manufacture of indophenolic compounds by condensing carbazole with a para-nitrosophenol compound and subsequently adding the reaction-mixture to a caustic soda solution whereby the indophenolic compound is precipitated, the step which comprises filtering off the precipitate at once.

26. In the manufacture of an indophenolic compound, the process which comprises condensing carbazole with a para-nitrosophenol compound in the presence of sulfuric acid having an initial strength of about 93.5 to 96 percent, the amount of sulfuric acid being such that at the completion of the condensation the strength of the acid is about 93–94 percent.

27. In the manufacture of an indophenol by the condensation of carbazole with p-nitrosophenol in the presence of sulfuric acid, the improvement which comprises bringing carbazole and p-nitrosophenol into reaction with one another in the presence of sulfuric acid having an initial strength of about 95 to 96 percent, the total amount by weight of the sulfuric acid employed being about five to six times the weight of the carbazole used in the condensation with the p-nitrosophenol.

28. In the manufacture of an indophenolic compound, the process which comprises condensing carbazole with a nitrosophenol in the presence of sulfuric acid at a temperature maintained between about +5° C. and about −30° C.

In testimony whereof we affix our signatures.

RAYMOND W. HESS.
ORIN D. CUNNINGHAM.